United States Patent

[11] 3,609,330

| [72] | Inventor | Anatoly Nikolaevich Volosevich<br>Moscow, U.S.S.R. |
|---|---|---|
| [21] | Appl. No. | 737,671 |
| [22] | Filed | June 17, 1968 |
| [45] | Patented | Sept. 28, 1971 |
| [73] | Assignee | Nauchno-Issledovatelsky Institut<br>Gidrometerorologi-cheskogo<br>Priborostroinia<br>ulitsa Razina, Moscow, U.S.S.R. |

[54] SIMULATION DEVICE FOR CALCULATION OF WATER DISCHARGE AND LEVELS IN RIVER AND CANAL BEDS AT TRANSIENT FLOWS
3 Claims, 7 Drawing Figs.

[52] U.S. Cl. ................................................. 235/184,
235/150.34, 328/142, 333/24
[51] Int. Cl. .................................................... G06q 7/57
[50] Field of Search .......................................... 235/185,
184, 151.34, 197; 333/7, 70 CR, 24

[56] References Cited
UNITED STATES PATENTS
3,505,512   4/1970   Fricke, Jr. et al. ............. 235/184

| 2,991,936 | 7/1961 | Baldwin et al. | 235/184 |
|---|---|---|---|
| 3,379,864 | 4/1968 | Petersen | 235/151.34 |
| 3,404,266 | 10/1968 | Woodley | 235/197 |

Primary Examiner—Malcolm A. Morrison
Assistant Examiner—Felix D. Gruber
Attorney—Waters, Roditi, Schwartz & Nissen ABSTRACT: A simulating device for calculating water discharge and levels in river and canal beds at transient flows, comprises at least one threshold-setting device and at least two RC networks. Each of the RC networks includes a capacitor and at least two resistors connected to the capacitor via contact groups of the relay of the threshold device. A basic decoupling module separates the RC networks by means of its input being connected to said capacitor of the first RC network and by its output being connected to the input of the other RC network. The time constants of the RC networks are changed at certain voltages by connecting another resistor of the same network to the capacitor through the contact groups of the threshold-setting device. An additional decoupling module is connected to the basic decoupling module and to the input of the threshold-setting device.

3,609,330

SIMULATION DEVICE FOR CALCULATION OF WATER DISCHARGE AND LEVELS IN RIVER AND CANAL BEDS AT TRANSIENT FLOWS

The present invention relates to analog computing devices and more particularly to devices for performing operational engineering calculations and predicting the rate of water discharge and Rc in river and canal Rc under normal and controlled flow conditions, and also for certain investigations in river hydraulics. Rc Rc Rc Rc Known in the art are analog computing devices adapted to calculate the rate of water discharge and levels in river and canal beds under transient flow conditions.

In the known devices, however, automatic variation of parameters that simulate the controlling ability of bed systems is effected in accordance with a time program which is compiled depending on the data of the water discharge values indicated graphically by the upstream discharge hydrograph.

The compilation of such programs requires cumbersome and complicated techniques and their setting is time-consuming.

With a change of the hydrograph shape and of the data on the water discharge of the upstream hydrograph the program of the parameter variation that simulates the controlling ability of bed systems has also to be altered.

Hence, the calculation of each particular discharge hydrograph involves the compilation and setting of a separate program.

The program can be compiled only with a certain approximation, whereby the area of the hydrograph thus calculated essentially differs from the area of the actual upstream discharge hydrograph, this involving serious calculation errors.

The calculations employing variable parameters can be made with the help of conventional devices and without recourse to additional programs only within 100 computing time intervals.

The device known heretofore is unsuitable for performing calculations with variable parameters if the upstream discharge hydrograph is not known beforehand, since in this case the program of the variation of parameters cannot be compiled.

It is an object of the present invention to provide an analog device for computing water discharge values and levels under transient flow conditions, in which device the parameters simulating the controlling ability of bed systems vary automatically depending on the water discharge in terminal hydrometric cross sections.

In accordance with these and other objects the essence of the invention resides in a simulation device for calculating the water discharge and levels under transient flow conditions in the beds of rivers and canals, including an arithmetic unit comprising decoupling modules that separate series-connected R-C networks having variable parameters which are varied by means of relays through whose contact groups the resistors of said networks are connected with capacitors, and further includes at least one additional decoupling module connected either to the decoupling module of the R-C network or to the capacitor thereof, the load of said additional decoupling module being connected to a threshold-setting device.

It is expedient that the threshold-setting device be constituted as a voltage divider that sets the operation threshold therefor, employing a transistor amplifier, a resistor load inserted into the collector circuit of the transistor, a bias resistor and a transistor gate, the base thereof inserted in parallel to the emitter-collector circuit of said amplifier, and a relay winding inserted into the collector circuit of said transistor.

The threshold-setting device can also be constituted as an amplifier incorporating a transistor with the relay winding connected in parallel to the emitter-collector circuit thereof.

These and other objects of the invention will become apparent from a description given hereinbelow of the exemplary embodiments of the present invention in conjunction with the accompanying drawings, in which.

Figure 1:
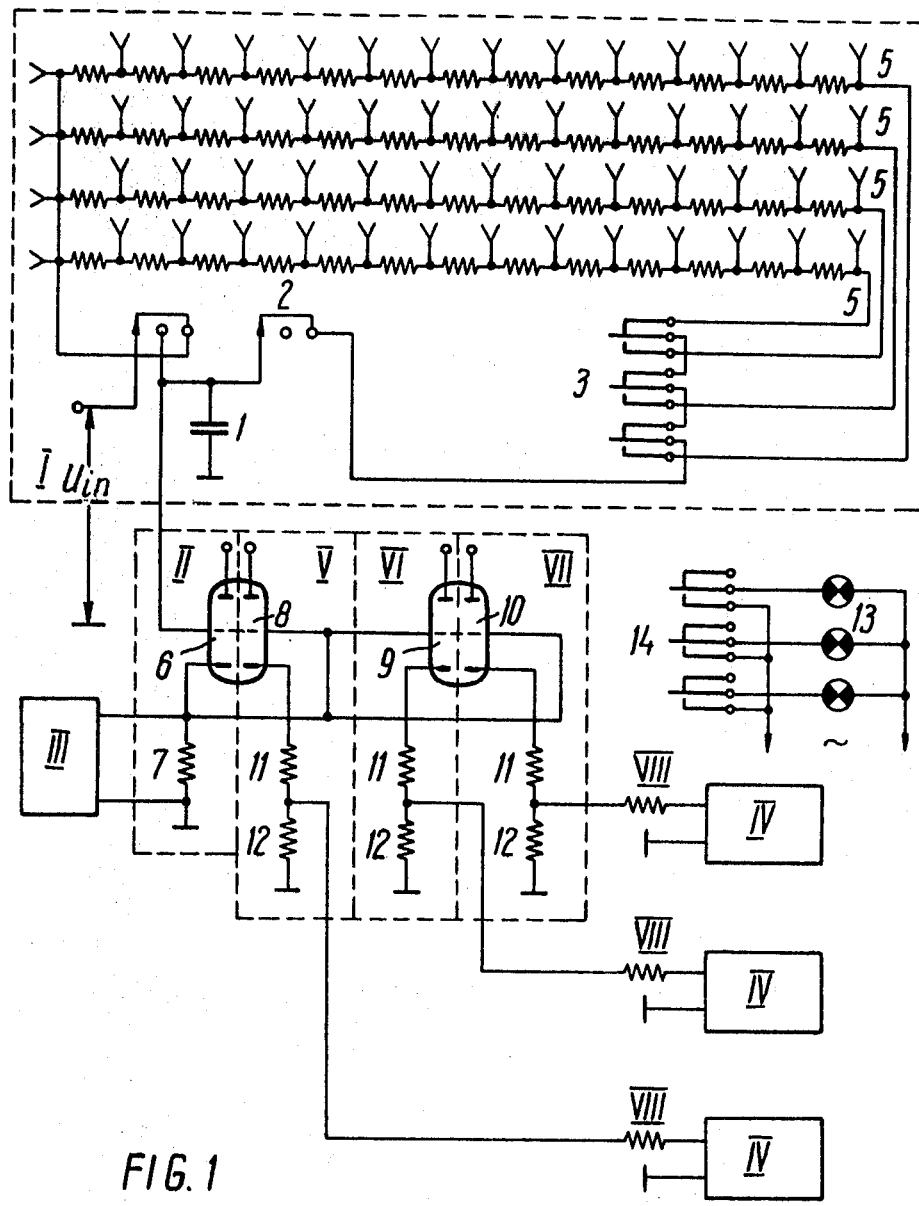
FIG. 1 illustrates an arithmetic unit of the simulation device of the present invention.
Figure 2:
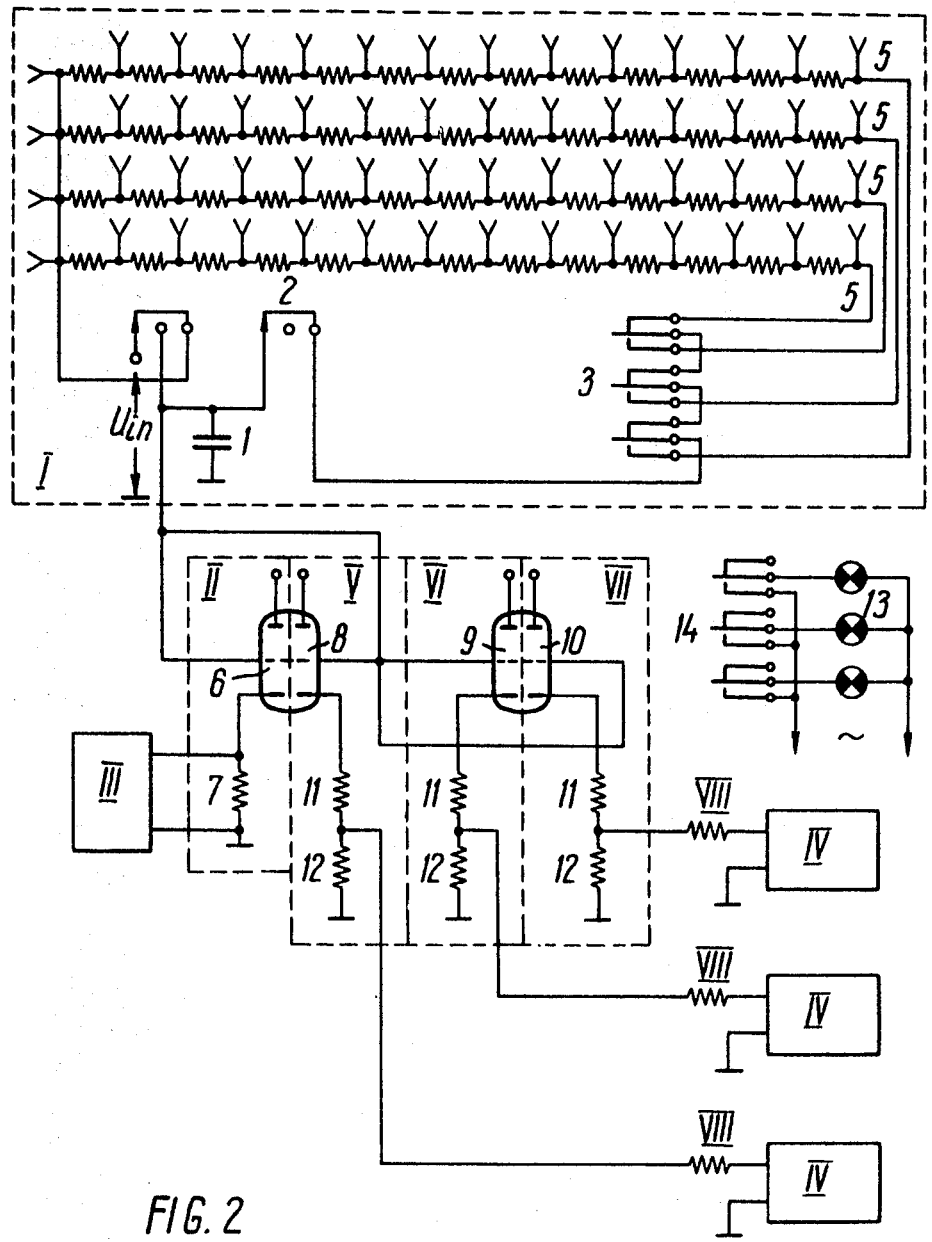
FIG. 2 illustrates another embodiment of the arithmetic unit of the simulation device of the invention.

Referring now to FIG. 1, an arithmetic unit comprises an R-C network I with variable parameters and a decoupling module II that separates said series-connected R-C network I from a similar R-C network III of the subsequent block of the arithmetic unit. The R-C network I with variable parameters comprises a capacitor 1 that is connected via contacts of a switch 2 and contact groups 3 of relays 4 of threshold-setting devices IV (FIG. 1) with four precision networks 5 (FIGS. 1 and 2).

The decoupling module II is a cathode follower incorporating a tube 6 and provided with a load resistor 7. The capacitor 1 of the R-C network I with variable parameters is connected to the grid of the tube 6. The load resistor 7 of the decoupling module II is connected to the R-C network III of the subsequent block of the arithmetic unit and to the grids of tubes 8, 9 and 10 of additional decoupling modules V, VI and VII.

Each cathode circuit of the tubes 8, 9 and 10 of said modules incorporates two load resistors 11 and 12. The resistor 12 of each additional decoupling module V, VI and VII is connected via a resistor VIII to the threshold-setting devices IV.

Pilot lamps 13 (FIGS. 1 and 2) serve for tuning the threshold-setting devices IV to a preset operating level. The pilot lamps 13 are ignited when contacts 14 of the relays 4 (FIG. 3) of the threshold-setting devices IV close.

According to another embodiment of the arithmetic unit (FIG. 2), the capacitor 1 of the R-C network with variable parameters is connected to the grid of the tube 6 of the decoupling module II and to the grids of the tubes 8, 9 and 10 of the additional decoupling modules V, VI and VII.

Figure 3:
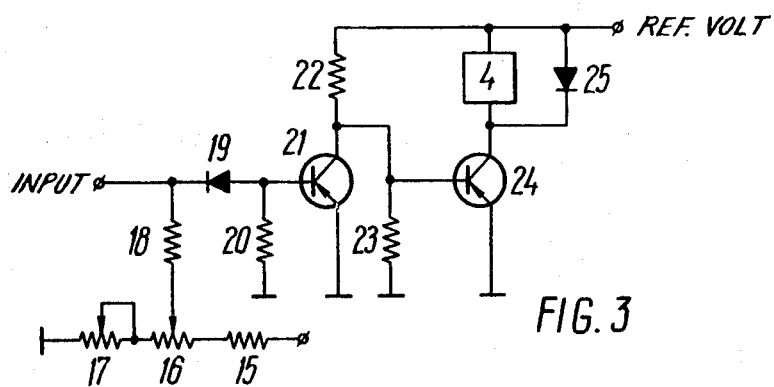
Figure 4:
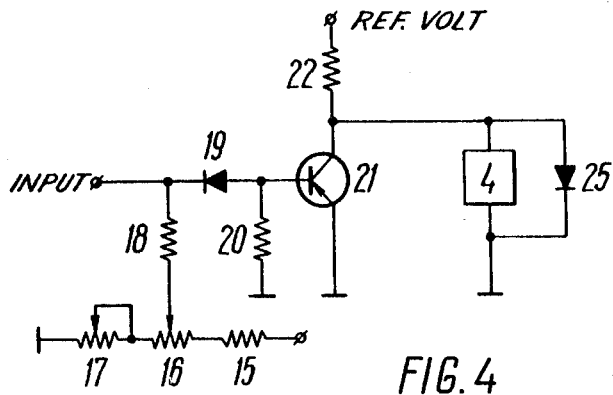

The threshold-setting device shown in FIG. 3 comprises a voltage divider constituted by a fixed resistor 15 and variable resistors 16 and 17. The tap of the resistor 16 is connected to one terminal of resistor 18 and the other terminal of resistor 18 constitutes an input terminal; a diode connects the input terminal to a resistor 20 and to the base of an amplifier employing a transistor 21. Inserted into the collector circuit of the transistor 21 is a load resistor 22 of said amplifier and parallel to the emitter-collector circuit thereof there are connected a resistor 23 and the base of a transistor gate 24. Connected into the collector circuit of the gate 24 is the winding of the relay 4 which is shunted by a diode 25. Each relay 4 (FIG. 3) of the threshold-setting devices comprises two pairs of contact groups 3 and 14 (FIGS. 1 and 2). Through the contacts 3 of the relay 4 the capacitors 1 (FIGS. 1 and 2) are connected to the precision networks of the R-C network I with variable parameters. In another embodiment of the threshold-setting device (FIG. 4) instead of a bias resistor 23 (FIG. 3) parallel to the emitter-collector circuit of the transistor 21 there is connected the winding of the relay 4 shunted by a diode 25.

Figure 5:
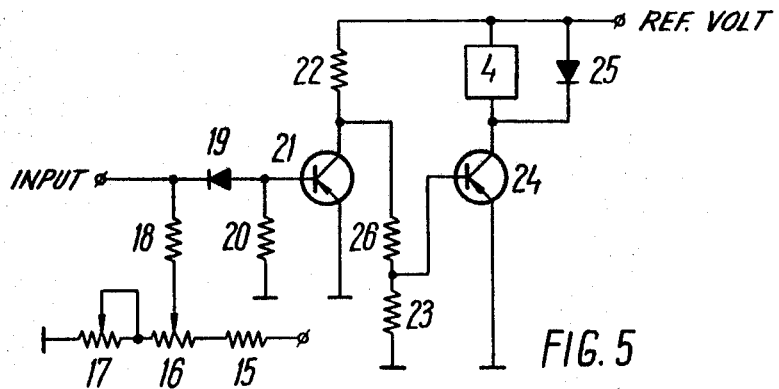
FIGS. 3, 4, 5, 6 and 7 show electric circuit diagrams of the different embodiments of the threshold-setting device of the arithmetic unit, according to the invention.

In the embodiment of the threshold-setting device shown in FIG. 5 a voltage divider is connected in parallel to the emitter-collector circuit of the transistor 21, said voltage divider being constituted of two resistors 26 and 23.

Figure 6:
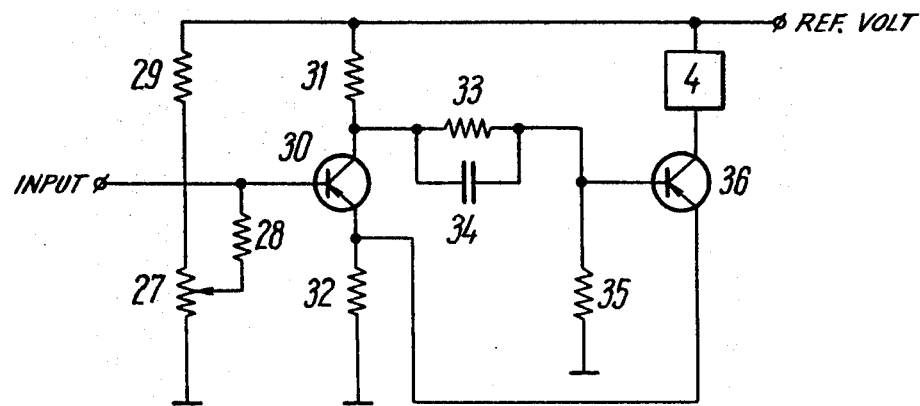

In the embodiment of the threshold-setting device shown in FIG. 6 the circuit comprises a voltage divider composed of resistors 29 and 27. The middle point of the variable resistor 27 through a resistor 28 is connected to the base of a transistor 30.

Inserted into the collector circuit of the transistor 30 is a load resistor and inserted into the emitter circuit of this transistor is a resistor 32. Connected to the collector of the transistor is a resistor 33, a resistor 35 being inserted in parallel therewith. The resistor 33 is shunted by a capacitor 34. Connected to the resistor 35 is the base of a transistor 36 inserted into the collector circuit of which is the winding of the relay 4.

The emitter of the transistor 36 and the emitter of the transistor 30 are interconnected.

Figure 7:
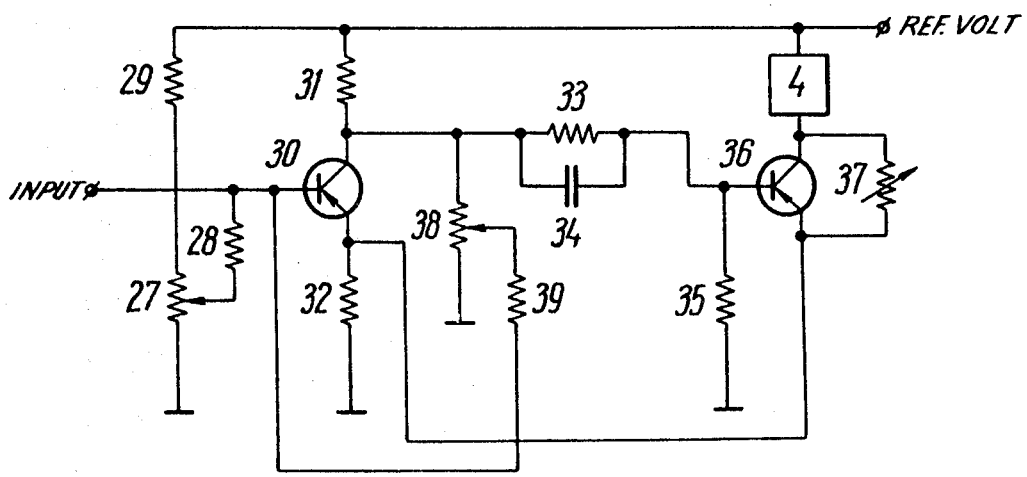

Shown in FIG. 7 is a circuit diagram of a threshold-setting device with adjustable threshold of operation and dropout. This circuit diagram differs from that shown in FIG. 6 by the fact that a resistor 37 is connected in parallel to the emitter-collector circuit of the transistor 36, and a variable resistor 38 is connected to the collector of the transistor 30, the second end of said variable resistor 38 being grounded. The middle point of the resistor 38 through a resistor 39 is coupled to the base of the transistor 30.

The device operates in the following way:

For a given river or canal bed the threshold-setting devices IV (FIGS. 1 and 2) are adjusted for threshold values corresponding to flow rates or water discharge values in terminal discharge sections, at which variations occur in the parameters $\tau$ that simulate the time of running in the bed sections.

For this purpose the arithmetic unit is fed with voltage that simulates the water discharge in the terminal hydrometric cross section of section $Q_1$ at which the time of running within this section equals $\tau_1$ and, by means of the variable resistors 16 and 17 (FIG. 3) a bias voltage is set to be impressed to the base of the transistor 21 of the threshold-setting device (FIG. 3) equal to the voltage fed to the arithmetic unit.

The control is effected by the ignition of the pilot lamps 13 (FIGS. 1 and 2). The other two threshold-setting devices IV (FIGS. 1 and 2) are adjusted in a similar manner.

In the initial state the base of the transistor 21 of the threshold-setting device (FIG. 3) will have a negative potential set by the variable resistors 16 and 17. The transistor 21 of the threshold-setting device is conductive. The resistance of the emitter-collector circuit of this transistor is very small and shunts the bias resistor 23 that sets the potential at the base of the transistor 24. Therefore the potential at the base of the transistor 24 is either zero or has a very small negative value and the transistor is made nonconductive by the operation of the relay 4. The relay 4 is deenergized, its normally closed contacts 3 (FIG. 1) are closed and the output of the initial precision resistor network 5 is connected to the capacitor 1 of the R-C network I with variable parameters. The normally open contacts 14 (FIG. 1) of the relay 4 (FIG. 3) are opened and the supply circuit of the pilot lamp 13 (FIG. 1) is disconnected.

When the arithmetic unit is supplied with a voltage that is portional and thus simulates the initial discharge hydrograph, a transient process commences in the R-C network I (FIGS. 1 and 2) that simulates the transformed water discharges in the given hydrometric cross section of the bed, with the running time within the bed section equal to $\tau_2$.

As the voltage across the capacitor 1 of the R-C network I with variable parameters increases, (FIGS. 1 and 2), this voltage is fed to the grid of the tube 6 of the decoupling module II, causing an increase of the voltage across the resistor 7 of said module. From the resistor 7 the voltage is passed to the R-C network III with variable parameters of the subsequent unit (FIGS. 1 and 2) and to the grids of the tubes 8, 9 and 10 of the additional decoupling modules V, VI and VII. As a result, the voltage across the resistor 12 increases. From the resistor 12 the voltage is fed to the threshold-setting device IV (FIGS. 1 and 3) diminishing the negative potential at the base of the transistor 21 (FIG. 3).

With the voltage across the base of the transistor 21 equal to zero, the transistor ceases to conduct. This results in a surge of a negative potential at the resistor 22 and at the base of the transistor 24 (FIG. 3). The relay 4 (FIG. 3) operates, its contacts 3 (FIGS. 1 and 2) are reset, the capacitor 1 of the R-C network I (FIGS. 1 and 2) becoming thus disconnected from the output of the precision resistor network 5 that has been connected thereto prior to the operation of the threshold-setting device, and the output of another precision network is connected to the capacitor 1 instead.

Concurrently the second pair of the contacts 14 (FIGS. 1 and 2) of the relay 4 (FIG. 4) close and the pilot lamp 13 (FIGS. 1 and 2) is ignited.

With the voltage at the base of the transistor 21 (FIGS. 3 and 5) being negative, the transistor starts conducting. The resistance of its emitter-collector circuit becomes small and shunts the bias resistor 23. This involves a zero or a very small negative potential at the base of the transistor 24.

The transistor 24 becomes nonconductive with respect to the operation current of the relay 4 (FIGS. 3 and 5). The relay 4 becomes deenergized and to the capacitor 1 (FIGS. 1 and 2) of the R-C network I with variable parameters that output of the initial precision network 5 becomes connected, which was connected prior to the operation of the threshold-setting device. In another embodiment of the threshold-setting device (FIG. 4) the base of the transistor 21 is fed, via the variable resistors 16 and 17, with a negative voltage equal to the operating value of the threshold-setting device. Therefore in the initial state the transistor 21 is conductive, the resistance of its emitter-collector circuit is very small and shunts the winding of the relay 4. With an increase of voltage at the input of the threshold-setting device (FIG. 4), the negative potential at the base of the transistor 21 decreases, and when it becomes zero, the transistor 21 ceases to conduct. The relay 4 of the threshold-setting device operates and its contacts 3 and 14 (FIGS. 1 and 2) are reset.

The threshold-setting device whose diagram is shown in FIG. 5 operates in the same manner as that shown in FIG. 3. The insertion of the additional resistor 26 decreases the negative potential at the base of the transistor 24 when the transistor 21 is conductive.

The threshold-setting device shown schematically in FIGS. 6 and 7 operates as follows:

By means of the resistor 27 a negative potential is set at the base of the transistor 30 equal to the operation threshold of the device, so that the transistor 30 in its initial state is conductive. The resistance value of the resistor 32 being small, the collector-emitter circuit of the transistor 30 and the resistor 32 shunt the voltage divider composed by the resistors 33 and 35. But since the emitter of the transistor 36 is connected to the resistor 32, the base of the transistor 36 is at a positive potential with respect to the emitter thereof and the transistor 36 is nonconductive. The relay 4 is deenergized.

As the voltage at the input of the threshold-setting device increases, the negative potential at the base of the transistor 30 drops. This involves an increase of the negative potential at the collector of the transistor 30 and a reduction in the voltage drop across the resistor 32. In this case the potential difference between the base and emitter of the transistor 36 tends to approach zero, and with the voltage at the base of the transistor 30 equal to zero, the potential at the base of the transistor 36 becomes negative. The transistor 36 starts conducting, the relay 4 operates, and a voltage drop is created across the resistor 32; the emitter of the transistor 30 being connected to the resistor 32, the base of the transistor 30 will be at a positive potential.

A decrease in the voltage at the input of the threshold-setting device brings about a decrease in the potential at the base of the transistor 30, and when the voltage in the base-emitter circuit thereof is negative, the transistor 30 starts to conduct, shunting the resistors 33 and 35. A voltage drop occurs across the resistor 32 and the potential at the base of the transistor 36 is positive.

In the threshold-setting device shown in FIG. 7 the operating threshold and the dropout threshold are controlled independently, this operation is achieved by feeding a portion of the voltage drop at the collectors of the transistors to the inputs thereof.

The adjustment of the operating threshold of the device is effected by the variable resistor 38 connected to the collector of the transistor 30, the voltage drop at the collector of the transistor 30 being fed from the middle point of the resistor 38 to the base of the transistor 30 via the resistor 39.

The adjustment of the dropout of the device is effected by means of the resistor 38 which is inserted between the collector and the emitter of the transistor 36.

The level of both thresholds (without changing the hysteresis loop) is set by the variable resistor 37.

Through the present invention has been described in connection with the preferred embodiment thereof, it is apparent that various changes and alterations may be resorted to without departing from the spirit and scope of the invention as those skilled in the art will easily understand.

Such changes and alterations are to be considered as falling within the true spirit and scope of the invention as defined in the appended claims.

What I claim is:

1. A simulating device for simulating water discharge and levels in bodies of water at transient flow conditions, said simulating device comprising at least one threshold-setting means, at least two R-C networks having respective inputs and outputs, each of said networks including at least two resistors and a capacitor, said threshold-setting means including a relay and contact means, said contact means being employed for interconnecting said resistors and capacitor with one another, a first decoupling module including an input connected to said capacitor of one of said R-C networks and an output connected to said respective input of the other of said R-C networks, said R-C networks having time constants, said time constants being variable as a function of the number of resistors connected to said capacitor by said contact means, and a second decoupling module including an input connected to said first decoupling module and an output connected to said threshold-setting means.

2. A simulating device as claimed in claim 1, wherein said threshold-setting means further comprises a voltage divider including at least one variable resistor for setting the operating threshold, a transistor amplifier connected to said divider, and a transistor gate connected to said transistor amplifier.

3. A simulating device as claimed in claim 2, wherein said transistor amplifier includes a collector and an emitter, and said transistor gate includes a collector and a base, and further including a load resistor connected to said collector of said amplifier, and a bias resistor connected in parallel with emitter the collector of said gate transistor and the base of said gate transistor being connected to the collector of said amplifier.